United States Patent [19]
Blake

[11] Patent Number: 5,707,709
[45] Date of Patent: *Jan. 13, 1998

[54] TWIN PLY FABRIC, USES AND MANUFACTURE THEREOF

[76] Inventor: Steven A. Blake, 989 Blandford Blvd., Redwood City, Calif. 94062

[*] Notice: The term of this patent shall not extend beyond the expiration date of Pat. No. 5,437,239.

[21] Appl. No.: 507,580

[22] Filed: Jul. 26, 1995

Related U.S. Application Data

[63] Continuation-in-part of Ser. No. 53,188, Apr. 27, 1993, Pat. No. 5,437,239.

[51] Int. Cl.$^6$ ............................................. B32B 3/06
[52] U.S. Cl. ............................ 428/102; 28/100; 112/475.22; 112/420; 112/413; 112/470.31
[58] Field of Search .................... 112/475.22, 420, 112/413, 470.31; 28/100; 428/102, 156, 171, 172

[56] References Cited

U.S. PATENT DOCUMENTS

| | | | |
|---|---|---|---|
| 3,183,868 | 5/1965 | Shotshy | 112/121.26 |
| 3,198,149 | 8/1965 | Schlegel | 112/420 |
| 3,270,696 | 9/1966 | Lowenstein | 112/420 |
| 4,879,169 | 11/1989 | Zafiroglu | 112/413 |
| 4,969,410 | 11/1990 | Brower et al. | 112/266 |
| 5,058,518 | 10/1991 | Card et al. | 112/266.2 |
| 5,437,239 | 8/1995 | Blake | 112/475.22 |

FOREIGN PATENT DOCUMENTS

| | | | |
|---|---|---|---|
| 1258476 | 3/1961 | France | 112/420 |
| 1248606 | 8/1967 | Germany | 112/420 |

*Primary Examiner*—James J. Bell
*Attorney, Agent, or Firm*—Harold D. Messner

[57] ABSTRACT

In the process of defining quilted fabric, non-stretchable, stretchable and interior layers of materials are wound on separate rollers. Then the layers are positively fed from the rollers to a bi-directional acting sewing assembly wherein the non-stretchable layer is provided with zero elongation and the stretchable layer is provided with 25 to 300 percent stretch. Next, the arranged layers are sewn in sets of sinusoidal-like seam patterns. Finally the stretched layer is permitted to relax to a natural state wherein a series of puffs are formed in rows across the layer normal to stretch direction of the stretchable layer. Result: columns of puffs of even numbered rows are aligned with each other but are laterally offset with respect to puffs of odd numbered rows by a constant amount.

12 Claims, 4 Drawing Sheets

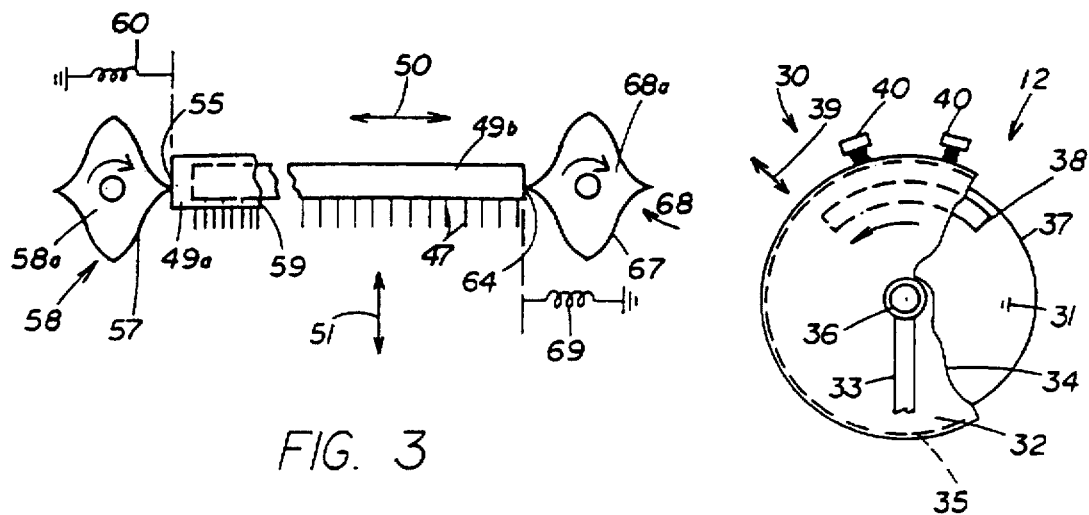
FIG. 3
FIG. 2
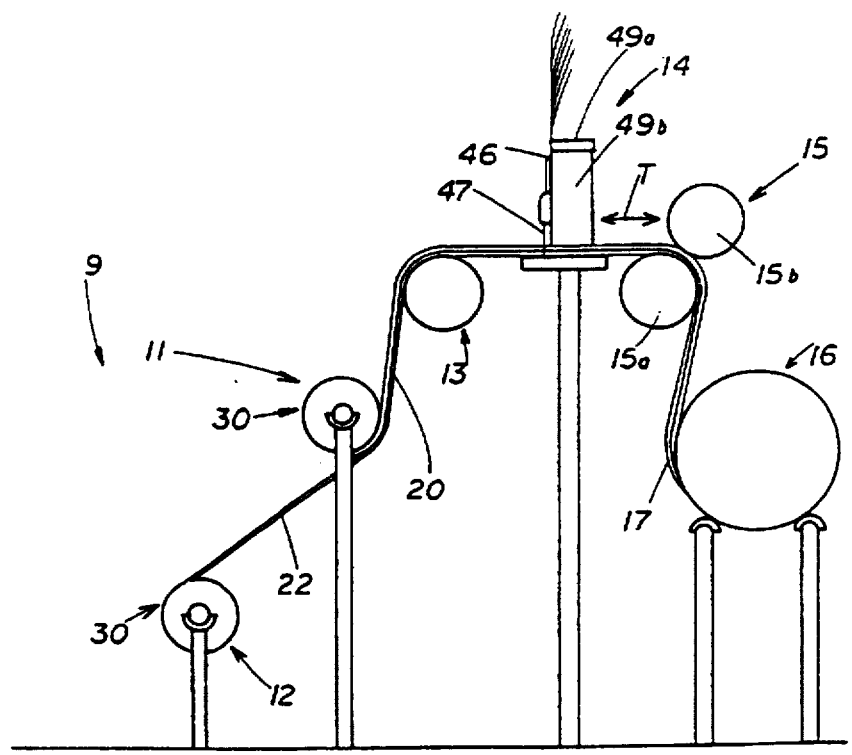
FIG. 1

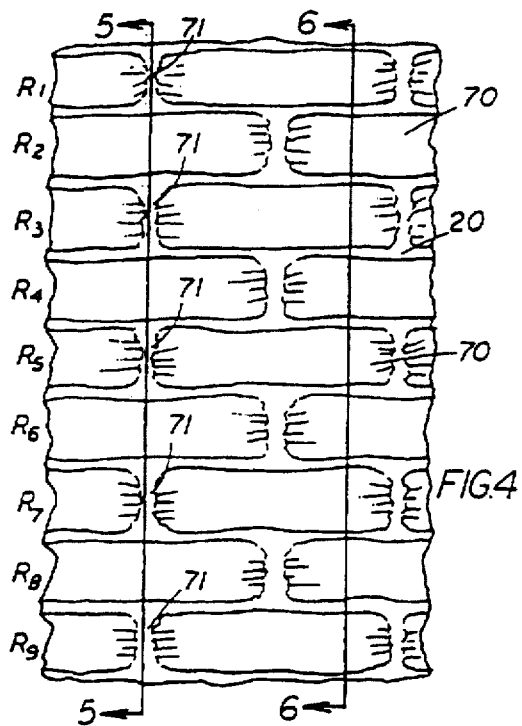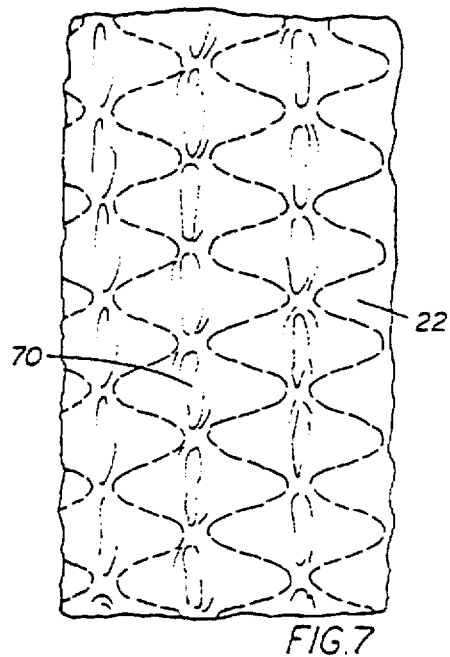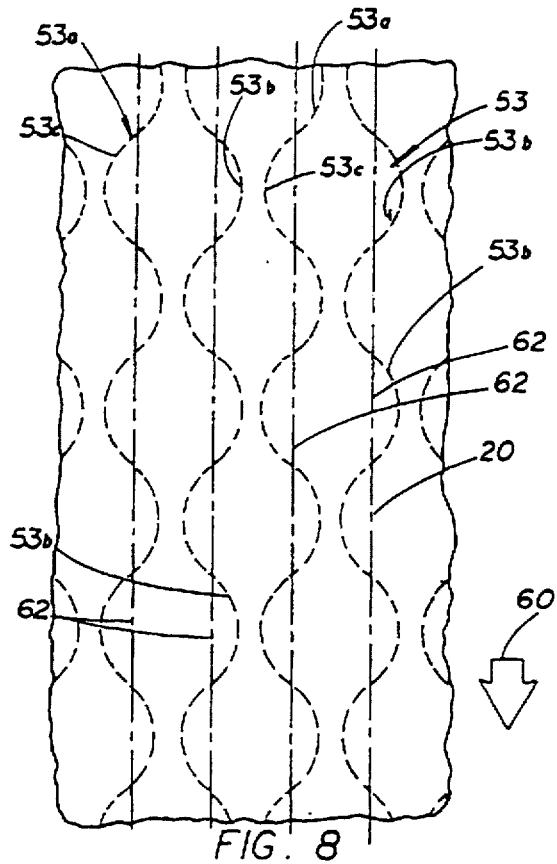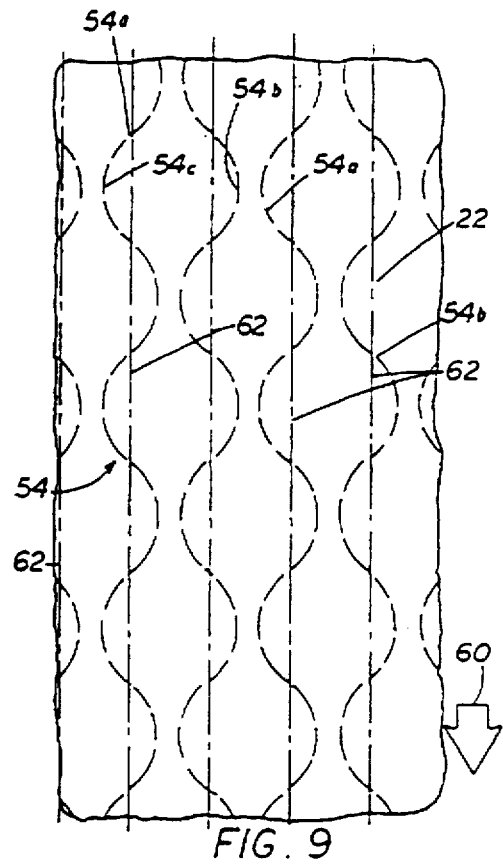

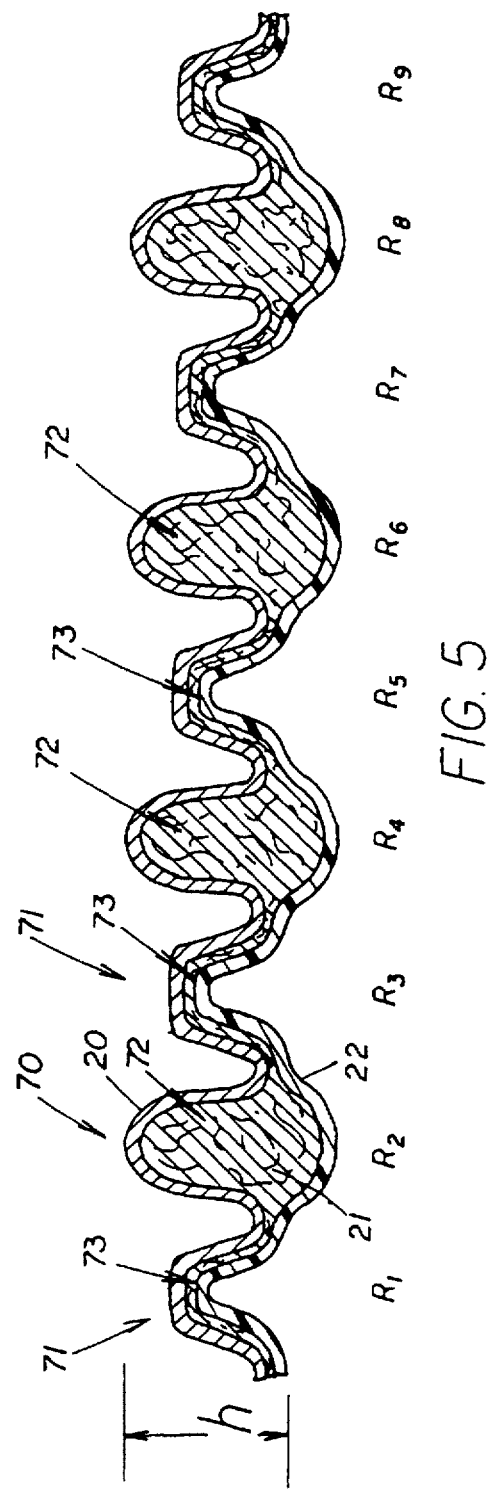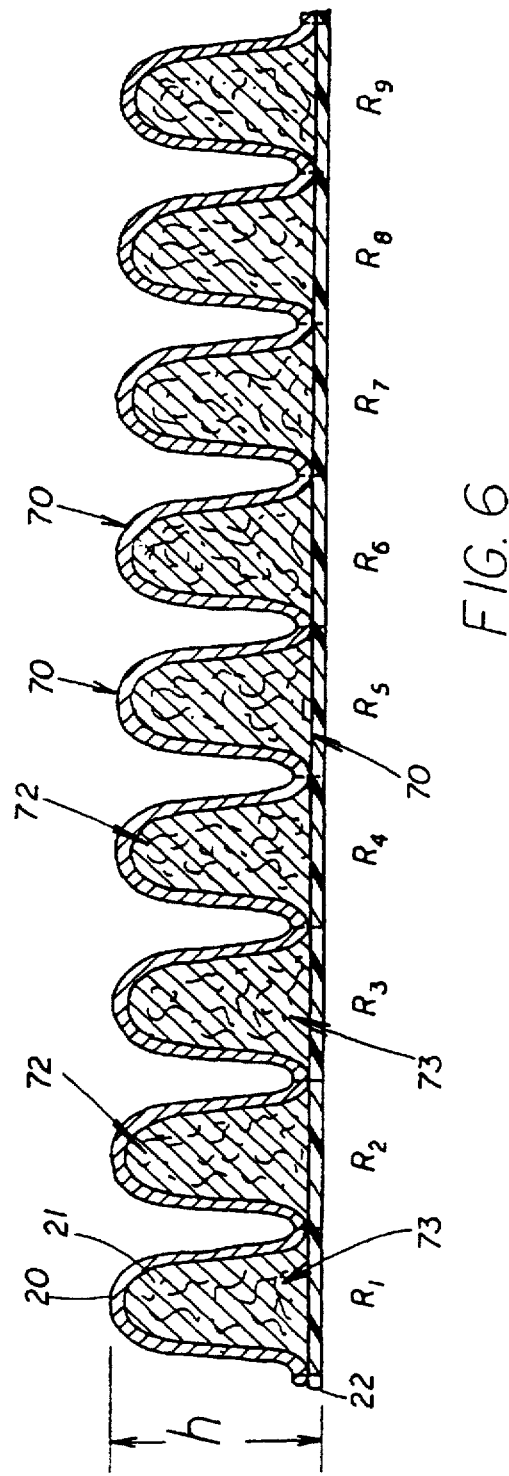

TWIN PLY FABRIC, USES AND MANUFACTURE THEREOF

RELATED APPLICATION

This a continuation-in-part of Ser. No. 08/053,188 filed Apr. 27, 1993 for "IMPROVED FABRIC, ITS MANUFACTURE AND USES THEREOF" now U.S. Pat. No. 5,437,239.

In the above-application, a fabric, manufacture and uses thereof, are described. As a result of the manufacturing process, the completed fabric comprising three separate layers, one of which being stretchable during formation and then relaxable thereafter, to provide a natural state wherein a series of puffs are formed in rows across the layers normal to the axial stretch direction of the stretchable layer, and columns of puffs of even numbered rows are aligned with each other but are laterally offset with respect to puffs of odd numbered rows a constant amount thereby creating an aesthetically pleasing finished fabric. It has now been discovered that if the top layer has natural resiliency such as found in velvet, silk and denim, there is sufficient volume to permit formation of puffs without the need of an interior layer.

SCOPE OF THE INVENTION

This invention relates to an improved puffed, quilt-like, smocked fabric consisting only of first and second layers stitched together in automated manner. In one aspect of the invention, the second, interior layer is fed from a roller via a positive roller driver, such second layer being biaxially stretchable such that the same undergoes elongation in the longitudinal direction between 50 to 100 percent of its normal relaxed state as a section (along with the first layer) pass a multiple stitching head of pre-selected lateral extent. The first exterior layer is not stretched but has a natural resiliency to permit formation of puffs after feeding in a position atop the second layer.

The stitching head undergoes cam controlled lateral movement as a function of longitudinal tandem movement of the first and second layers comprising the fabric of the invention to define a saw-toothed stitch pattern when viewed from the interior second layer but creating worm-like folds when viewed from the outer first layer wherein the length of each fold is a function of the normalized two values from which the arcuate amplitudes of neighboring stitch patterns vary over one-half of the section (i.e., the fabric section is equal to a cycle of the sawtoothed stitching pattern.).

DEFINITIONS

These terms are used in the specification and are defined as follows.

SMOCKING—A decorative stitching used in gathering cloth to make it hang in folds.

QUILT—To stitch together as two pieces of cloth with a soft innerlayer in lines or patterns of square, longitudinal or lateral extending lines.

FABRIC—Cloth formed by fibers by the processes of weaving, knitting, pressing etc., wherein the fibers can be formed from naturally occurring products such as wool, hair, cotton, flax, hemp or can be formed of synthetic fibers.

FIBER—The fundamental unit used in the fabrication of textile yarns and fabrics. A unit used in the fabrication of textile yarns and fabrics. A unit of matter characterized by having a length at least 100 times its diameter or width, and having definitely preferred orientation of its crystal unit cells with respect to a specific axis.

SYNTHETIC TEXTILES—A group of man-made fibers made by chemical synthesis or by chemical compounds through interaction.

STRETCH FABRICS—Cloths that have properties of elongation and recovery from using Spandex and like yarns.

STRETCH YARNS—Specially treated, synthetic continuous filament yarn. Examples: giving torque or false twist; by deforming them. Merits are rapid and near completed recovery and improved holding power.

TRIAXIAL STRETCH FABRIC—Cloths that have the ability to stretch and recover along x, y and bias axes in equalized segments, i.e., segment measurements per common length per common tensile force per x, y or bias directions are equalized.

BIAXIAL STRETCH FABRIC—Cloths that have the ability to stretch and recover along both the bias axis and one of the x or y axis is minimum.

YARN—A continuous string of textile fibers such as spun or continuous filament yarns. Spun yarn is short fibers while the latter is a grouping of endless parallel continuous filaments, its the basic material made into fabric, thread, twine or cable. It can be woven, knotted, crocheted, tatted, netted or braided depending on the result desired and the character of the yarn. Continuous filament yarns are formed of rayon, nylon and other synthetic textiles.

YARN NUMBER—A conventional measure of fineness of yarn. In spun yarns, a lower number means the heavier the yarn while a higher number refers to finer-sized yarns. Man-made fibers are measured in deniers and is the reverse of the above, viz., lower number means finer-sized yarns and vice versa.

BACKGROUND OF THE INVENTION

While various techniques are available for forming puffed fabrics, these are manufactured by batch processes using individual sewing heads wherein the layers of material pass in multiple pass fashion across the sewing heads. As a result, the final fabric is expensive and labor intensive.

In my above-identified application, I set forth a method of making a puffed fabric comprising three separate layers, one of which being stretchable during formation after which the same is permitted to relax to its natural state wherein a series of puffs are formed in rows across the layers normal to the axial stretch direction the stretchable layer, and columns of puffs of even numbered rows are aligned with each other but are laterally offset with respect to puffs of odd numbered rows a constant amount. As a result, there is created an aesthetically pleasing finished fabric. It has now been discovered that if the top layer has a natural resiliency but still is non-stretchable such as found in velvet, silk, denim and like materials, there is sufficient volume to permit formation of folds without the need of an intermediate layer between the exterior non-stretchable layer and the interior stretchable layer. As a consequence, a lower cost yet aesthetically pleasing fabric is created.

SUMMARY OF THE INVENTION

The present invention relates to an improved puffed, smocklike quilted fabric consisting of a natural resilient first layer such as velvet, silk or denim overlaying a stretchable interior second layer. The layers are stitched together in automated manner. The second layer is a synthetic long chain polymer comprising at least 85% of a segmented polyurethane commonly called Spandex having biaxial stretching capability and is fed from a roller via positive roller driver such the second layer undergoes biaxial elongation in the longitudinal direction between 25 percent to 300 percent of its normal relaxed state with a range of 100 percent to 250 percent being preferred as a section passes through a multiple stitching head. The stitching head undergoes cam controlled lateral movement as a function of longitudinal movement of the fabric to provide a puffed, smock-like quilted fabric. The fabric is particularly well adapted for use in making garments such as coats and the like as well as a covering for burial caskets.

The biaxial stretch capacity of the second layer is normally between 600 to 700% of its relaxed state. Hence an uniform stretching force applied along the width of the layers to provide 25 to 300% is easily achieved. The second layer is preferably called by the generic name "Spandex". Spandex itself is defined as a manufactured fiber in which the fiber-forming substance is a long chin synthetic polymer comprising at least 85% of a segmented polyurethane (Source: FTC). Examples are Lycra, Glospan and Numa, all trademarked fabrics. In the manufacturing process of Lycra, a trademark of DuPont Company, the segmented polyurethane structure is achieved by reacting diisocyanates with long chain glycols which are usually polyester or polyethers of 1000 to 2000 molecular weight range. The reaction product is then chain extended through the use of glycol, diamine or water. This gives the final polymer which is converted into fibers by dry spinning. In the finished fiber the chains are randomly oriented and when stretched, the chains become oriented but exhibit spontaneous recovery to the disordered state upon release of the force acting on the fiber.

During manufacture of the fabric of the invention, the second layer formed of Spandex is wound on a roller. The roller is controlled by a driver to provide positive unrolling of the second layer to provide a substantially constant velocity relative to the driver. Such driver also provides the second layer with an uniform elongation or stretch across the width of the second layer, such elongation being between 1¼ to 3 times normal. The driver also provides uniform movement of the first (upper) layer wherein its roller is unrolled without positive braking second pressure being applied. The rollers containing the first and layers are pulled toward the multiple sewing head by the driver that contacts the first and second layers and provides inwardly directed pressure relative therebetween. The drive pressure applied to the first layer is well below its tensile strength however.

The multiple sewing head is provided with a cam assembly the provides of lateral movement of the plurality of threaded needles to provide side-by-side sinusoidal line patterns. The plurality of threaded needles are divided into a first set provided with common lateral movement through a first cam and cam follower subassembly. Between neighboring needles of the first set, there is provided a needles of the second set. Such needles is provided with opposite movement through a second cam and cam follower subassembly. As a result, its sinusoidal line pattern is complementary to line pattern of the first set. After the quilted fabric passes downstream of the driver, the second layer of Spandex is permitted to return to it relaxed state and the finished fabric is wound about a final roller. The finished fabric as viewed from the first layer in its relaxed state comprises rows of elongated puffs extending above a base line and of uniform length normal to the precursor initial stretch direction of the second layer defined during sewing. The ends of adjacent puffs of any row are crimped by stitching so that any one row of puffs resembles a string of attached wieners. Between successive rows, the crimped ends of the puffs of one row are offset relative to he crimped ends of its next adjacent neighboring row of puffs. Thus, the columns of puffs of every other row are aligned but successive columns are offset. As a result, an aesthetically pleasing fabric is formed that has be useful in making coats (the rows of puffs running in vertical manner from the neck toward the belt and sleeves) and in padding the inner walls of a casket.

BRIEF DESCRIPTION OF THE DRAWINGS

FIG. 1 is a schematic view illustrating the process by which present invention is performed including a series of rollers carrying thereon first and second layers in a longitudinal direction to and through a sewing head assembly, the layers being pulled in a positive sense by a positive driver positioned between a multiple sewing head and a take-up roller upon which the puffed fabric of the invention is wound;

FIG. 2 is an end view, partially cut-away, of the roller about which the second layer is wound, having a brake assembly;

FIG. 3 is a detail side view, partially schematic, of the cam assembly for providing bilateral, independent movement of the two sets of needles comprising the multiple needle head wherein sinusoidal stitching pattern is provided the layers passing adjacent to the needles head;

FIG. 4 is a plan view of the puffed fabric wound of he take up roller of FIG. 1 in which the second layer is in relaxed state:

FIGS. 5 and 6 are vertical sections taken along line 5—5 and 6—6, respectively, of FIG. 4;

FIG. 7 is bottom view of the puffed fabric of FIG. 4;

FIG. 8 is a plan view of the puffed fabric of FIG. 4 in which uniform force has been applied to provide biaxial stretch the fabric to illustrate the elongated shape of the puffs under such condition similar to that occurring at the sewing head of FIG. 1;

FIG. 9 is a bottom view of the puffed fabric of FIG. 4 in similar to that occurring in FIG. 8;

DETAILED DESCRIPTION OF THE INVENTION

Figure 11:
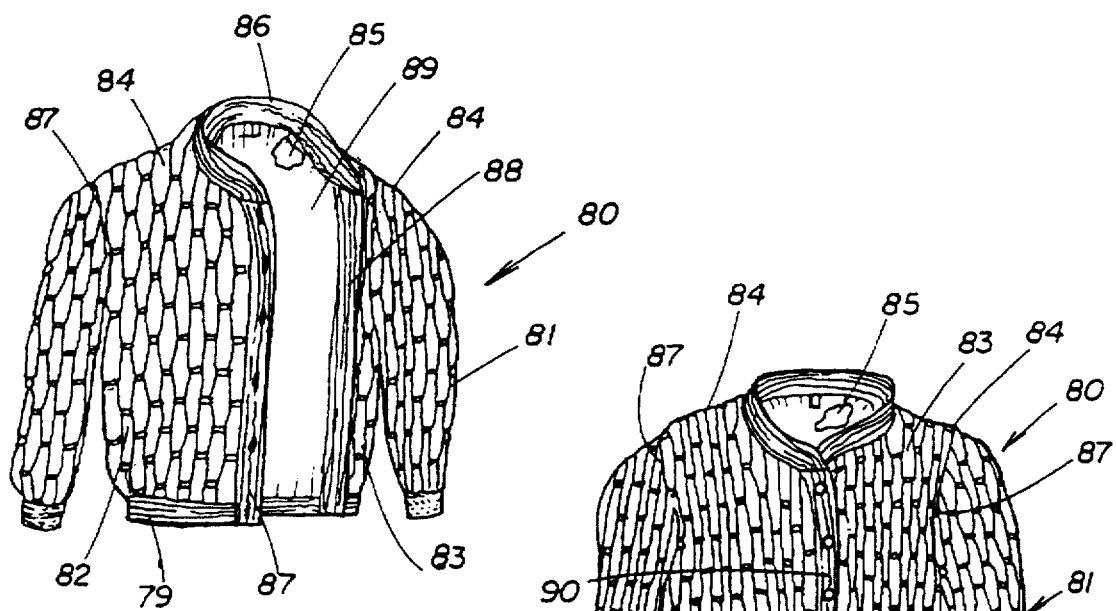
FIG. 11 is a front view of the coat of FIG. 10 unbuttoned to illustrate its lining and construction thereof.

FIG. 1 illustrates in schmatic fashion, an assembly 9 by which the process of the present invention is performed. As shown, a series of rollers 11, 12 and 13 are depicted upstream of a multiple sewing head assembly 14. Downstream from the sewing head assembly 14 are a driver roller assembly 15 and a take-up roller 16. A non-stretch layer 20 such as velvet, silk and/or denim is wound about roller 11. A biaxial stretch layer 22 is wound about roller 12. The height and position of the rollers 11 and 12 so that the layers 20 and 22 pass over the feed roller 13 in planar face-to-face relationship wherein the non-stretch layer 20 is above the biaxial stretch layer 22.

The layers 20, 22 pass between sewing head assembly 14 under positive pressure via positive drive rollers 15a, 15b of the driver roller assembly 15.

The rollers 11 and 12 are unwound via the force applied by the driver roller assembly 15 at the downstream side of the sewing head assembly 14. The roller 11 is provided with conventional tension controls for holding proper tension on the layer 20. In accordance with the present invention, the same tension must be applied to positive drive rollers 15a, 15b of the driver roller assembly 15 on take-up as is applied to the layer 20, feeding into sewing head assembly 14. Once in rotation, the roller 11 tends to rotate with a constant velocity. In this regard, the rollers 11 and 12 include a braking assembly 30 as shown in FIG. 2. The purpose of the braking assembly 30: to cause biaxial stretching of the lower layer 22 wound about roller 12 (see FIG. 1) in an amount 25 to 300% of the relaxed state of the layer 22, as previously mentioned, as well as to cause 0% elongation of the top and interior layers 20, 21. After the lower layer 22 is permitted to relax, the finished fabric 17 of the invention is wound about take-up roller 16.

FIG. 2 shows the braking assembly 30 in more detail. As shown, FIG. 2 relates to roller 12 but the description which follows is also germane to similar braking assemblies associated with the roller 11. As shown, end 31 of the roller 12 rotates within a stationary drum 32 attached to upright standard 33. The drum 32 has an end wall 34 and side wall 35 that extend adjacent to the end 31 of the roller 12. The end wall 34 includes a hub 36 that attaches to the upright standard 33. Note that the circumferencial side wall 34 extends over a portion of the circuferential surface 37 of the roller 12. An arcuate brake pad 38 is placed in contact with outer surface 37 of the roller 12 and is capable of radial movement in the direction of arrow 39 via bolts 40 having interior ends that butt against the pad 38. As shown, the bolts 40 attach to and through threaded openings (not shown) in the side wall 35 of the drum 32. Note that the tension applied by the separate brake assemblies 30 to the rollers 11 and 12 of FIG. 1 is separately adjustable. The purpose of the adjustments: to cause biaxial stretching of the lower layer 22 in an amount 25 to 300% of the relaxed state of the layer 22, as previously mentioned, as well as to cause 0% elongation of the top layer 20. Since the amount of tension at the drive roller assembly 15 for the rollers 11 and 12 is constant, the maximum braking or friction force (F) for the rollers 11 and 12 is a function of the elongation strength of the layers 20 and 22 such that such tension force (T) of the drive assembly 15 is below the ultimate strength of the layer 20 but is sufficent to provide between 25 to 300% elongation of the layer 22.

Returning to FIG. 1, while the sewing head assembly 14 is typical for the purpose of stitching the layers 20–22 together using side-by-side needle bars 49a, 49b having separate side walls 46 into which needles 47 are attached. The needle bars 49a, 49b are also controlled to undergo separate, lateral movement, however. The direction of such lateral movement is depicted by arrow 50 in FIG. 3. In addition, the needles 47 of the needle bars 49a, 49b also undergo typical vertical movement in the direction of arrow 51. As a result, thread releasably attached to the needles 47 is caused to enter the layers 20, 22 to provide typical stitching patterns 53, 54 of FIGS. 8 and 9 as viewed from the top layer 20 and bottom layer 22, respectively.

Lateral movement of the needle bars 49a, 49b is depicted in detail in FIG. 3.

As shown, the needle bar 49a has an end 55 forming a cam follower surface in contact with surface 57 of cam subassembly 58. The end 55 is provided positive surface tension via spring 60 so that the interaction of the shape of the surface 57 of the rotating cam 58a of the cam subassembly 58 provides for left-hand stitchings 53a, 54a of the patterns 53, 54 respectively shown in FIGS. 8 and 9. Returning to FIG. 3, note that needle bar 49a is open along its bottom edge 59. As a consequence the needles 47 associated with the needle bar 49a form a first set, while the needles 47 associated with the needle bar 49b forms a second set. Between neighboring needles 47 of the first set, there is a needle 47 of the second set controlled by needle bar 49b.

That is to say, the needle bar 49b has an end 64 forming a cam follower surface in contact with surface 67 of cam 68a of cam subassembly 68. The end 64 is provided positive surface tension via spring 69 so that the interaction of the shape of the surface 67 of the rotating cam 68a of the cam subassembly 68 provides for the right-hand stitchings 53b, 54b of the patterns 53, 54, respectively shown in FIGS. 8 and 9. Note in FIGS. 8 and 9 that uniform tension has been applied to the finshed fabric 17 in the direction of arrow 60 to provide biaxial stretch as the needle bars 49a, 49b move laterally to the direction of application of the tensil force (T), see FIG. 1. In addition, the seam patterns 53, 54 are seen each to be sinusoidal-like in plan view, oscillating about axes of formation 62 wherein peaks 53b, 54b and troughs 53c, 54c of side-by-side seams laterally coincide in a direction normal to arrow 60.

As a result of the relative stetching of the layer 22 as the complementary sinudoidal stitch patterns 53, 54 of FIGS. 8 and 9 are laid down, there is provided a series of improved puffs 70 of the surface of layer 20 and in layer 22 as shown in FIGS. 4 and 7, respectively. Note that in FIG. 4, the puffs 70 are shaped as shown as soon as the the pre-tensioning force in the direction of arrows 60 in FIGS. 8 and 9 are released and the layer 22 of FIG. 7 is permitted to relax as the finished fabric 17 of FIG. 1 is wound about take-up roller 17. Note that the puffs 73 appear on the surface of the layer 20 and layer 22 as shown in FIGS. 4 and 7, respectively.

FIGS. 5 and 6 are sections that illustrate the shape of the puffs 70 in more detail as viewed along columnar lines 5—5 and 6—6 of FIGS. 5 and 6, respectively.

Note in FIG. 5 that the section is taken through rows R1, R2 ... Rx of the puffs 70 of FIG. 4 such that the section line of the odd rows R1, R3, R5 ... passes through arcuate ends 71 of the puffs 70 of such odd rows. Thus the puffs 70 of the odd numbered rows R1, R3, ... in FIG. 4 are columnarly aligned. Also the puffs of the even numbered rows R2, R4 ... are columnarly aligned but offset from puffs 70 of the odd numbered rows R1, R3 ... But the section line is seen to also bisect the puffs 70 of the even rows R2, R4 ... at maximum height h of each puff 70. As a result, the puffs 70 of the even rows R2, R4 ... define cavities 72 between top and bottom layers 20, 22.

While the layers 20 22 forming the puffs 70 of the odd rows R1, R3 ... follow the same contour so that the cavities 73 are of minimum volume.

Note in FIG. 6 that the section is taken through rows R1, R2 ... Rx of the puffs 70 at a columnar location in which the height h of the puffs 70 is seen to be essentially constant from row-to-row. Moreover, the cavities 72, 73 of the rows R1, R3 ... are of the same shape and volume. The cavities 72, 73 are formed between top and bottom layers 20, 22.

But referring again to FIG. 4, the puffs 70 of odd numbered rows R1, R3, R5 ... are seen to be columnarly aligned. Also the puffs 70 of the even numbered rows R2, R4, R6 ... are likewise columnarly aligned but are offset from puffs 70 of the odd numbered rows R1, R3 ... by a constant amount, say equal to L/2 where L is the length of each puff 70.

Figure 10:
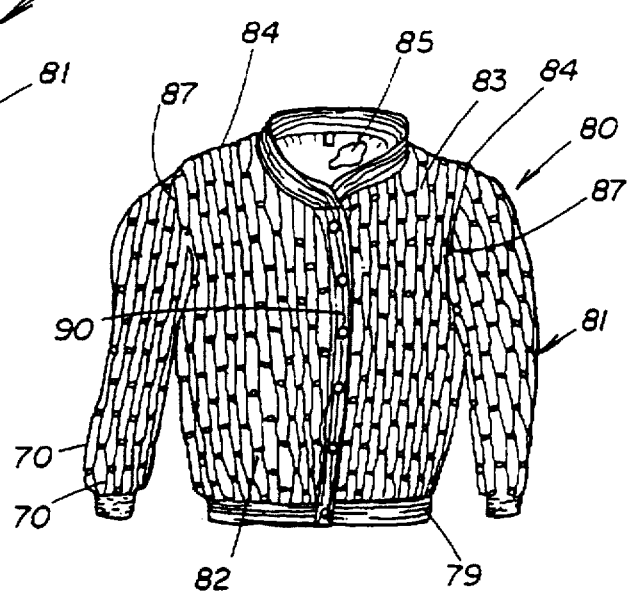
FIG. 10 is a front view of a buttoned coat constructed with the puffed fabric of the invention in which the aesthetically pleasing rows of puffs run in a vertical manner from the neck toward the belt and sleeves of the coat.

FIGS. 10 and 11 illustrate a garment 80 in the form of a jacket comprising an outer shell 81 formed of the finished fabric 17 associated with take-up roller 16, see FIG. 1. The outer shell 81 has a pair of front panels 82, 83 attached to a waistband 79 and a rear panel 85. The rear panel 85 is attached to the front panels via shoulder seams 84. Sleeves 86 are also a component of the outer shell 81 and are attached via an arcuate set of seams 87 to the front and rear panels 82, 83 and 85. An attached collar 86, front button bands 87, 88 and inner liner 89, complete the garment 80. The collar 86 attaches to the upper edges of the front and rear panels 82, 83 and 85. The button bands 87, 88 attach vertically between the collar 86 and the waistband 79 and laterally via side edges 90 of front panels 82, 83. Note that the puffs 70 of the outer shell 81 has rows R1, R2, R3 . . . that run generally in a vertical pattern between the waistband 79 and the collar 86. As a result, the vertical line of the puffs 70 is generally slimming to the user and pleasing to the eye of the on-looker.

Figure 12:
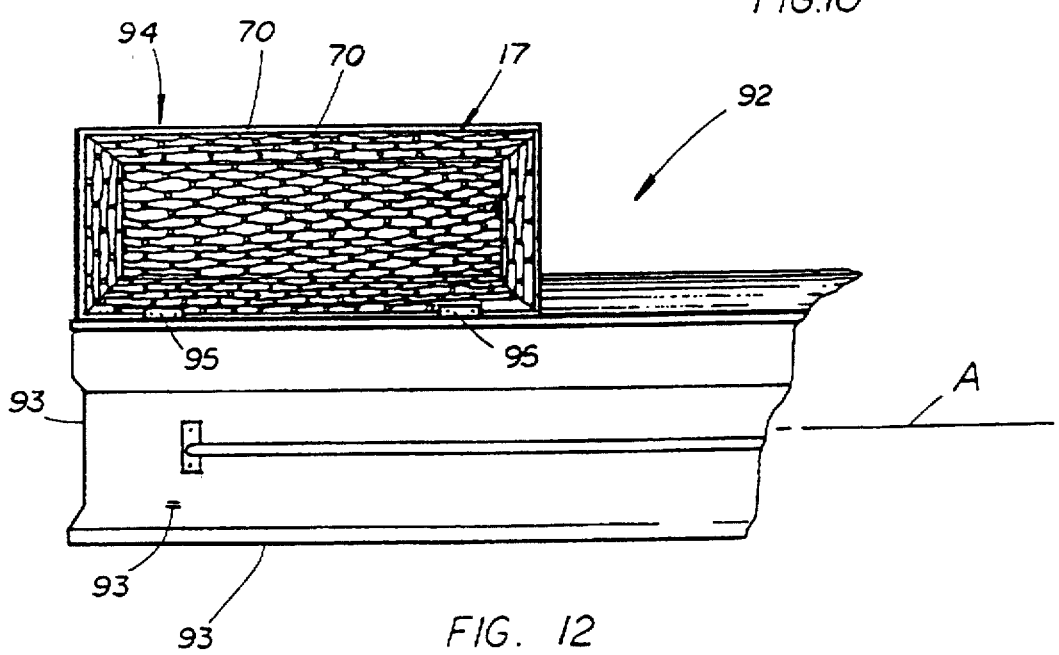
FIG. 12 is a top view of a pillow in which the pillow covering is formed of the fabric of the invention.

FIG. 12 is a top view of a pillow 92 that includes a pair of front and rear panels 93, 94 of rectangular cross section internalizing an interior filler material 95 of a conventional type such as feathers, plastic (polyethylene, polypropylene etc.). Each front and rear panel 93, 94 includes top and bottom edges 96, 97 and a pair of side edges 98. Top and bottom seams 99 and side seams 100 attach together the front and rear panels 93, 94. Note that the puffs 70 of the pillow 92 run generally parallel to the top and bottom seams 99 so as to be pleasing to the eye of the on-looker.

While preferred embodiments have been shown and described in the foregoing, it will be understood that the invention is capable of numerous modifications, rearrangements and substitutions without departing from the spirit of the invention as set forth in the appended claims. For example, the invention is capable of being carried out using a quilting machine manufactured by Edgewater Machine Company, 13–20 131st St., College Park, N.Y. wherein such machine is modified to provide correct braking of the layers of material prior to sewing and to provide correct movement of the sewing head relative to such layers as sewing occurs.

What is claimed is:

1. A process for forming a puffed, smock-like quilted fabric comprising an exterior layer of non-stretchable material and bi-axial stretchable material overlaying a soft interior layer stitched together in automated manner, comprising the steps of:
    (a) winding non-stretchable and stretchable layers on separate rollers,
    (b) placing the rollers in a quilting arrangement, positively feeding the layers from the rollers to a bidirectional acting sewing assembly to provide essentially zero elongation for the non-stretchable layer and essentially 25 to 300 per cent stretch for the bi-axial stretchable layer in an axial stretch direction parallel to advancement of said stretchable, non-stretchable layers,
    (c) sewing the arranged layers in sets of sinusoidal-like seam patterns across the layers wherein each of said sinusoidal like seam patterns has an axis of formation essentially parallel to said axial stretch direction of the bi-axial stretchable layer,
    (d) relaxing the stretchable layer to relax to a natural state wherein a series of puffs are formed in rows across the layers normal to said axial stretch direction the stretchable layer, and columns of puffs of even numbered rows are aligned with each other but are laterally offset with respect to puffs of odd numbered rows a constant amount thereby creating an aesthetically pleasing finished fabric.

2. The process of claim 1 in which side-by-side seam patterns are complementary, wherein said seam patterns are each laterally aligned in a direction normal to the stretch direction of the stretchable layer relative to said each axis of formation of the seam patterns.

3. The process of claim 1 in which said non-stretchable layer has an ultimate tensile strength of known value and wherein tensioning stretch force applied to the non-stretchable and stretchable layers is less than said ultimate tensile strength for the non-stretchable layer.

4. A process for forming a puffed, smock-like quilted finished fabric comprising an exterior layer of non-stretchable material and an interior layer of bi-axial stretchable interior material, stitched together in automated manner, comprising the steps of:
    (a) winding non-stretchable and stretchable layers on separate rollers,
    (b) positively feeding the layers from the rollers in an alignable quilting arrangement to a bidirectional acting sewing assembly to provide essentially zero elongation for the non-stretchable layer and essentially 100 to 250 per cent stretch for the bi-axial stretchable layer in an axial stretch direction parallel to advancement of said stretchable and non-stretchable layers,
    (c) sewing the arranged layers in sets of sinusoidal-like seam patterns across the layers wherein each of said seam patterns has an axis of formation essentially parallel to said axial stretch direction of the bi-axial stretchable layer,
    (d) allowing the stretchable layer to relax to a natural state wherein a series of puffs are formed in rows across the layers normal to said axial stretch direction of the stretchable layer thereby creating an aesthetically pleasing finished fabric.

5. The process of claim 4 in which puffs of even numbered row are columnarly aligned with each other but being laterally offset with respect to puffs of odd numbered rows by a constant amount thereby creating an aesthetically pleasing finished fabric.

6. The process of claim 5 in which each of said series of puffs is defined by a length L parallel to said axial stretch direction of the stretchable layer and wherein said constant offset amount is equal to L/2.

7. A puffed, smock-like quilted finished fabric comprising an exterior layer of non-stretchable material and an interior layer of bi-axial stretchable material stitched together in automated manner having a series of puffs and columns of even number in a constant amount, formed by the steps of:
    (a) winding non-stretchable and stretchable layers on separate rollers,
    (b) positively feeding the layers from the rollers in a quilting arrangement to a bidirectional acting sewing assembly to provide essentially zero elongation for the non-stretchable layer and to provide essentially 25 to 300 per cent stretch for the bi-axial stretchable layer in an axial stretch direction parallel to advancement of said stretchable and non-stretchable layers,
    (c) sewing the arranged layers in sets of sinusoidal-like seam patterns across the layers wherein each of said sinusoidal-like seam patterns have an axis of formation essentially parallel to said axial stretch direction of the bi-axial stretchable layer,
    (d) allowing the stretchable layer to relax to a natural state wherein a series of puffs are formed in rows across the layers normal to said axial stretch direction the stretchable layer, and columns of puffs of even numbered rows are aligned with each other but are laterally offset with respect to puffs of odd numbered rows a constant amount thereby creating an aesthetically pleasing finished fabric.

8. The fabric of claim 7 in which each of said series of puffs is defined by a length L parallel to said axial stretch direction of the stretchable layer and wherein said constant offset amount is equal to L/2.

9. The fabric of claim 7 in which side-by-side seam patterns are complementary wherein maximum peaks and troughs of each are laterally aligned in a direction normal to said axial stretch direction of the stretchable layer relative to said each axis of formation of the seam patterns.

10. The fabric of claim 7 in which said non-stretchable and interior layers have separate ultimate tensile strengths and wherein tensioning stretch force applied to the non-stretchable and stretchable layers is less than said ultimate tensile strength for the non-stretchable layer.

11. The fabric of claim 7 formed into a jacket with attached collar comprising an outer shell having a pair of front panels attached to a waistband, a rear panel attached to said front panels via a pair of shoulder seams, and sleeves attached via arcuate seams to said front and rear panels, said puffs associated with said front and rear panels and said sleeves defining said rows wherein said rows run generally vertically between said waistband and said collar wherein the vertical pattern of said puffs are generally slimming for the user and pleasing to the eye of the on-looker.

12. The fabric of claim 7 formed into a pillow without the need of gathering and cabling the fabric, wherein the pillow comprises front and rear panels of rectangular cross section each defining top and bottom edges and a pair of side edges, top and bottom seams for attaching together said top and bottom edges of said front and rear panels, a pair of side seams for attaching together said pairs of side edges of said front and rear panels, and an interior filler layer, said puffs associated with said front and rear panels defining rows wherein said rows run generally horizontally between said pair of side seams wherein the horizontally pattern of said puffs are pleasing to the eye of the on-looker, puffs are generally slimming for the user and pleasing to the eye of the on-looker.

* * * * *